UNITED STATES PATENT OFFICE.

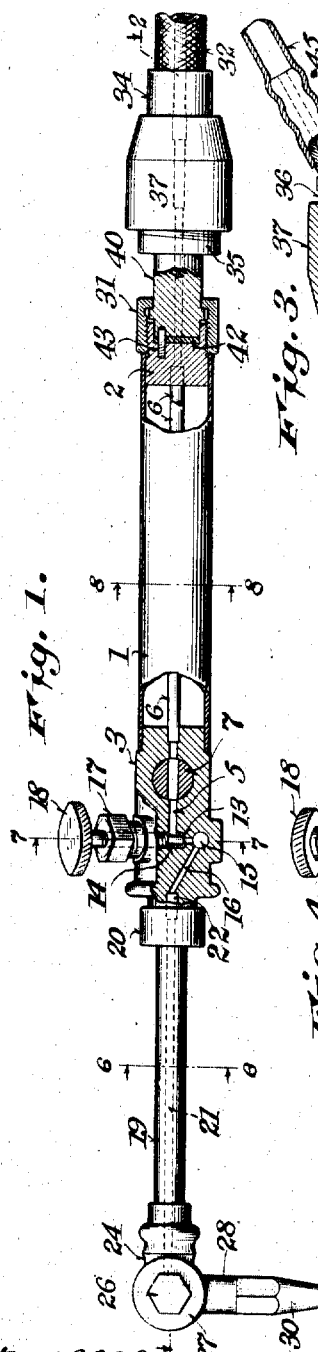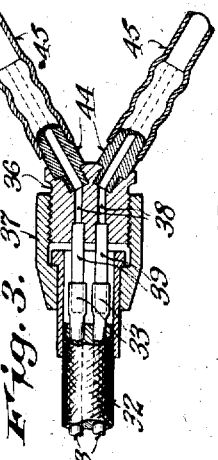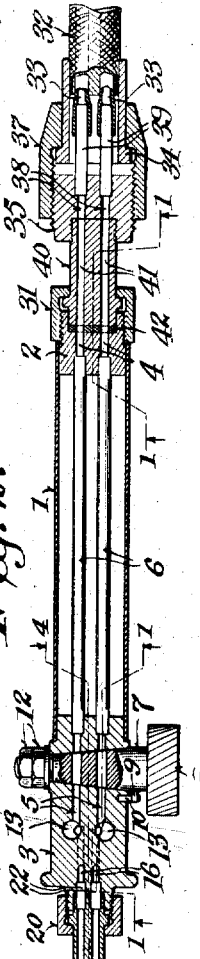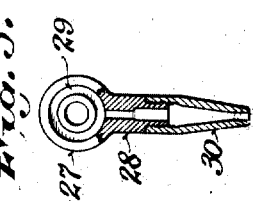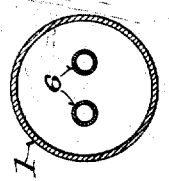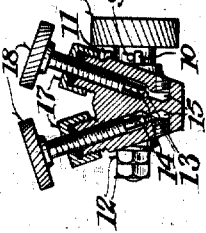

RUDOLPH J. J. MUELLER, OF SHEBOYGAN, WISCONSIN, ASSIGNOR TO UNIVERSAL OXYGEN COMPANY, OF SHEBOYGAN, WISCONSIN, A CORPORATION OF WISCONSIN.

GAS-TORCH.

1,222,319.     Specification of Letters Patent.     Patented Apr. 10, 1917.

Application filed January 7, 1915. Serial No. 898.

*To all whom it may concern:*

Be it known that I, RUDOLPH J. J. MUELLER, a citizen of the United States, residing at Sheboygan, in the county of Sheboygan and State of Wisconsin, have invented certain new and useful Improvements in Gas-Torches, of which the following is a specification, reference being had to the accompanying drawing, forming a part thereof.

This invention relates to blow pipes or torches in which oxygen and an inflammable gas or mixture of gases such as hydrogen and acetylene, are used for welding, autogenic soldering, brazing or fusing of metals, or the application of a high degree of heat to restricted areas.

The main objects of the invention are to permit the torch to be used with ease and freedom at different distances and in different directions from the gas supply tanks or reservoirs; to facilitate changing torches and removing and replacing parts thereof and of their connections; to facilitate regulation and control of the supply of gases to the nozzle; and generally to improve the construction and operation of torches of this class.

It consists in the construction, arrangement and combination of parts as hereinafter particularly described and pointed out in the claims.

In the accompanying drawing like characters designate the same parts in the several figures.

Figure 1 is a side elevation of a torch embodying the invention, parts being broken away and shown in section indicated by the lines 1—1, Fig. 2; Fig. 2 is a longitudinal section of the torch on the line 2—2, Fig. 1; Fig. 3 is a sectional view of a hose coupling for connecting the torch with reservoirs containing different gases; Fig. 4 is a longitudinal section on the line 4—4, Fig. 2, of the regulating and stop valve case and associated parts; Fig. 5 is a detached view, partly in section, of the nozzle; Fig. 6 is an enlarged cross section of the tubular handle shank on the line 6—6, Fig. 1; Fig. 7 is a cross section of the valve case on the line 7—7, Fig. 1, showing the regulating valves; and Fig. 8 is an enlarged cross section on the line 8—8, Fig. 1, of the tubular handle and inclosed gas tubes.

The torch comprises a tubular or hollow handle 1, preferably of cylindrical form, provided at one end with a coupling head 2, and at the other end with a valve case 3. The head 2 and valve case 3 are formed with parallel longitudinal gas passages 4 and 5, which are connected by tubes 6, leading lengthwise through the handle tube 1, and tightly fitted at the ends into enlargements of the passages in the head and valve case. The passages 5 are intersected by a conical or tapering bore which extends transversely through the valve case 3, and in which is fitted a conical or tapering stop valve 7. The valve 7 is formed as shown in Fig. 2, with transverse ports or passages arranged to register with the passages 5 and to simultaneously open or close them. At its larger end the valve 7 is provided with a knurled head or handle 8, and between the head or handle and the valve case, with a stop pin or lug 9, which by engagement with pins or lugs 10 and 11 on the case, limits the rotary movement of the valve and determines its open and closed positions. At its smaller end, which is reduced and threaded, the valve 7 is provided with a washer and nuts 12, for holding it in place and maintaining a close working fit between it and its seat in the case 3.

At their front ends the passages 5 open into upwardly extending and diverging bores forming valve chambers 13, in which are threaded the stems of regulating valves 14. Below their intersections with the passages 5 the valve chambers are formed with seats for the valves 14, and below said seats communicate with separate transverse bores 15, which for convenience of construction are closed at the outer ends by plugs, as shown in Fig. 7, and which communicate with passages 16 leading therefrom through the front end of the valve case 3. The threaded stems of the regulating valves 14, passing upwardly through stuffing boxes and glands 17 on the valve case, are provided at their upper ends with knurled heads or handles 18.

At its front end the valve case 3 is formed with a reduced externally threaded extension with which a tubular shank 19 is detachably connected by a coupling nut 20. The shank 19 is formed with longitudinal passages 21, which are connected with passages 16 in the valve case by short metal tubes 22, fitting into enlargements of the passages, a soft metal packing washer being interposed between the valve case and the end of the shank 19, which fits into a socket formed therefor in the valve case. A dowel pin 28, secured in the socket of the valve case and engaging with a hole in the end of the shank 19, as shown in Fig. 4, insures correct registration of the passages 21 with the passages 16 when the parts are coupled together, as shown in Fig. 2. At its opposite or front end the shank 19 is tightly fitted and secured in the tubular neck of a pivot head 24, which is formed with a mixing chamber and passage 25, communicating at one end with the passages 21 and opening at the other end through one side of the head, as shown in Fig. 2. The head 24, which is preferably of substantially circular shape, is formed with a central socket in which a pivot and clamping bolt 26 is threaded. On this bolt a head 27 of a nozzle 28, is pivoted. The nozzle head, which is preferably of circular shape to correspond with the head 24, is formed in one side as shown in Fig. 5, with a circular or curved channel 29, concentric with the pivot bolt 26, and adapted to register in different angular positions of the nozzle with the outlet opening of the passage 25. The channel 29 communicates on one side with the bore of the nozzle, which is preferably provided with a detachable tip 30, for the purpose of renewing the same if it is burned or injured, or replacing it with a tip having a larger or smaller jet orifice.

The head 2, as shown in Figs. 1 and 2, is extended beyond the handle tube 1, and has a coupling nut 31, threaded thereon, for detachably connecting a flexible pipe or hose 32, with the torch. The flexible pipe or hose 32, which has two longitudinal gas passages, may be constructed as shown, of two rubber tubes 33, which form the separate gas passages, and are inclosed in a protecting sheath of woven wire or other suitable material, with a filling of asbestos or other material surrounding the tubes within the sheath. At its ends the pipe or hose 32 is provided with flanged ferrules or sleeves 34, which are detachably connected with externally threaded heads 35 and 36 by coupling nuts 37, as shown in Figs. 2 and 3. The heads 35 and 36 are formed with gas passages 38, and are provided with short metal tubes 39, tightly fitted and secured therein and extending therefrom, the ends of the rubber tubes 33 being drawn over the projecting ends of the tubes 39 within the ferrules or sleeves 34. The head 35 is provided, as shown in Figs. 1 and 2, with a neck 40, having longitudinal passages 41 corresponding with and adapted to connect the passages 4 in the head 2, and the passages 38 in the head 35. This neck is formed adjacent to one end, which is fitted in a socket in the head 2, with an external collar or shoulder for engagement with the nut 31 by which the pipe or hose 32 is detachably connected with the head 2. A washer or gasket 42, of suitable packing material, is interposed between the head 2 and the neck 40, to form gas tight joints between the passages 4 and 41, holes being formed in the gasket or washer corresponding with said passages. To insure proper registration of the passages 41 with the passages 4 when the pipe or hose 32 is connected with the torch, the head 2, as shown in Fig. 1, is provided with a dowel pin 43, fitting into a socket or hole in the neck 40.

The head 36 is provided, as shown in Fig. 3, with divergent nipples 44, which communicate with the passages 38, and to which rubber tubes 45 are attached, for connecting the pipe or hose 32 with drums or reservoirs containing the gases, such as oxygen and hydrogen, acetylene or other hydrocarbon or combustible gas such as is used with torches of this class.

The flexible connections and couplings as herein shown and described, not only permit the torch to be used by the operator with freedom in various positions and at different distances and in different directions from the gas tanks or reservoirs, but also facilitate changing torches and replacing or repairing any part of the connections which may be defective.

In the operation of the torch, the nozzle may be readily set at any desired angle to the handle for the most convenient manipulation thereof according to varying conditions, by loosening the bolt 26, which is then tightened to hold the nozzle securely in its adjusted position relative to the handle.

The quantity of each gas and the relative proportions of the gases supplied to the nozzle are varied by the adjustment of the regulating valves 14, the handles 18 of which are closely associated with each other and within constant and easy reach of the operator while the torch is in use.

The supply of both gases to the nozzle is instantly cut off without disturbing the adjustment of the regulating valves 14, by turning the valve 7, the handle of which is close to the handles of the regulating valves, and like them, constantly and easily accessible while the torch is in use, the closed position of the valve being determined by engagement of the stop pin 9 with the stop pin 11. In like manner both gases are admitted to the nozzle by turning the valve 7 in the reverse direction till the stop pin 9 engages with the stop pin 10. In this position of the valve both of its ports register with the passages 5 in the valve case 3, as shown in Figs. 1 and 2.

Various changes in minor details of construction and arrangement of parts may be made without departure from the principle and scope of the invention as defined in the following claims.

I claim:

1. In a gas torch the combination of a handle provided at one end with a coupling head and at the other end with a valve case, and having longitudinal gas passages connected with corresponding passages in said head and case, a nozzle, a tubular shank having longitudinal passages connecting the nozzle with the corresponding passages in the valve case, independently adjustable regulating valves controlling the gas passages in the valve case and located side by side, and a stop valve fitted in said case close to the regulating valves and adapted to simultaneously open or close said passages.

2. In a gas torch the combination of a handle having longitudinal gas passages and provided at one end with a valve case having passages communicating with the passages in the handle, a tubular shank connected with the handle and having a mixing chamber and passages connecting said chamber with the corresponding passages in the valve case, a nozzle connected with said shank in communication with the mixing chamber, independently adjustable valves fitted side by side in said case for separately regulating the supply of gases therethrough to the nozzle, and a stop valve fitted in said case close to the regulating valves and adapted to simultaneously open or close the gas passages without disturbing the adjustment of the regulating valves.

3. In a gas torch the combination of a handle having longitudinal gas passages and provided at one end with a valve case having passages communicating with the passages in the handle, a tubular shank detachably connected at one end with the handle and having passages communicating with the corresponding passages in the valve case, a nozzle detachably connected with the other end of said shank in communication with the gas passages therein, independently adjustable regulating valves separately controlling the gas passages in the valve case, and a stop valve adapted to simultaneously open and close said passages independently of the regulating valves.

4. In a gas torch the combination of a handle provided with longitudinal gas passages, a nozzle having a shank provided with passages communicating with the passages in the handle at one end thereof, a flexible pipe having corresponding longitudinal gas passages, and a coupling comprising two separable members, one attached to the other end of the handle and the other to said pipe, and having registering passages communicating with the passages in the handle and pipe respectively, and a nut swiveled on one member and threaded on the other.

In witness whereof I hereto affix my signature in presence of two witnesses.

RUDOLPH J. J. MUELLER.

Witnesses:
IDA B. ZUFELT,
A. C. PRESCOTT.